(12) United States Patent
Balan et al.

(10) Patent No.: US 12,153,700 B2
(45) Date of Patent: *Nov. 26, 2024

(54) MULTI-LAYER REDACTION POLICIES IN DOCUMENTS STORED ACROSS A PLURALITY OF REPOSITORIES

(71) Applicant: Rocket Software Technologies, Inc., Waltham, MA (US)

(72) Inventors: Sudhi Balan, Fairfield, CT (US); Helena Russell, New Canaan, CT (US); Yan Bregman, East Brunswick, NJ (US)

(73) Assignee: Rocket Software Technologies, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/344,654

(22) Filed: Jun. 29, 2023

(65) Prior Publication Data

US 2023/0342485 A1    Oct. 26, 2023

Related U.S. Application Data

(63) Continuation of application No. 17/069,853, filed on Oct. 13, 2020, now Pat. No. 11,775,666.
(Continued)

(51) Int. Cl.
*G06F 21/62* (2013.01)
*G06F 3/0482* (2013.01)
(Continued)

(52) U.S. Cl.
CPC ........ *G06F 21/6218* (2013.01); *G06F 3/0482* (2013.01); *G06F 3/0483* (2013.01);
(Continued)

(58) Field of Classification Search
CPC .... G06F 21/6218; G06F 21/31; G06F 21/604; G06F 16/256; G06F 16/211;
(Continued)

(56) References Cited

U.S. PATENT DOCUMENTS

| | | | |
|---|---|---|---|
| 1,765,355 A | * | 6/1930 | Brewster ............... B61L 3/121 246/190 |
| 5,911,143 A | | 6/1999 | Deinhart et al. |

(Continued)

FOREIGN PATENT DOCUMENTS

| | | | | |
|---|---|---|---|---|
| CA | 3099783 A1 | * | 11/2019 | ........... G11B 27/028 |
| WO | WO2008003593 A1 | | 1/2008 | |

(Continued)

OTHER PUBLICATIONS

Choudhri et al., "PatientService: Electronic Patient Record Redaction and Delivery in Pervasive Environments." Proceedings 5th International Workshop on Enterprise Networking and Computing in Healthcare Industry (HealthCom). IEEE, Jul. 2003, 7 pages.
(Continued)

*Primary Examiner* — Shahid K Khan
(74) *Attorney, Agent, or Firm* — Danielson Legal LLC

(57) ABSTRACT

Provided are methods and systems for federated redaction of select content in documents stored across multiple repositories. With the presently disclosed technology, multi-layer redaction policies can be defined in either regular expression or with pattern matching. The redaction policies are associated with one or more document classes, and applied to the associated documents in substantially real-time. Further, document governance policies can be defined such that users of certain roles may view certain content in an unredacted form, despite the presence of a redaction policy for the document.

25 Claims, 16 Drawing Sheets

Related U.S. Application Data

(60) Provisional application No. 62/923,381, filed on Oct. 18, 2019.

(51) Int. Cl.

| | | |
|---|---|---|
| *G06F 3/0483* | (2013.01) | |
| *G06F 16/21* | (2019.01) | |
| *G06F 16/25* | (2019.01) | |
| *G06F 21/31* | (2013.01) | |
| *G06F 21/60* | (2013.01) | |
| *G06F 40/106* | (2020.01) | |
| *G06N 5/01* | (2023.01) | |
| *H04L 9/40* | (2022.01) | |

(52) U.S. Cl.
CPC .......... *G06F 16/211* (2019.01); *G06F 16/256* (2019.01); *G06F 21/31* (2013.01); *G06F 21/604* (2013.01); *G06F 40/106* (2020.01); *G06N 5/01* (2023.01); *H04L 63/101* (2013.01); *H04L 63/102* (2013.01); *H04L 63/105* (2013.01); *H04L 63/205* (2013.01); *G06F 2221/2141* (2013.01)

(58) Field of Classification Search
CPC .... G06F 40/106; G06F 3/0482; G06F 3/0483; G06F 2221/2141; G06N 5/003; H04L 63/101; H04L 63/102; H04L 63/105; H04L 63/205
See application file for complete search history.

(56) References Cited

U.S. PATENT DOCUMENTS

| | | | |
|---|---|---|---|
| 6,950,825 | B2 | 9/2005 | Chang et al. |
| 7,185,192 | B1* | 2/2007 | Kahn .................. G06F 21/6218 707/999.102 |
| 9,032,076 | B2 | 5/2015 | Buehler et al. |
| 9,430,125 | B1* | 8/2016 | Blitzer ..................... G06F 8/38 |
| 10,318,762 | B1 | 6/2019 | Buckingham et al. |
| 10,990,689 | B1* | 4/2021 | Reiner .................. G06F 21/604 |
| 11,755,760 | B2 | 9/2023 | Balan et al. |
| 11,775,666 | B2 | 10/2023 | Balan et al. |
| 2005/0108526 | A1 | 5/2005 | Robertson |
| 2006/0129817 | A1 | 6/2006 | Borneman et al. |
| 2007/0030528 | A1* | 2/2007 | Quaeler .................. G06F 16/33 358/448 |
| 2007/0094594 | A1* | 4/2007 | Matichuk .............. G06F 40/253 715/255 |
| 2007/0198450 | A1 | 8/2007 | Khalsa |
| 2007/0208685 | A1 | 9/2007 | Blumenau |
| 2008/0120302 | A1 | 5/2008 | Thompson et al. |
| 2009/0025063 | A1* | 1/2009 | Thomas .............. G06F 21/6218 726/4 |
| 2009/0164878 | A1* | 6/2009 | Cottrille .............. G06F 21/6245 726/21 |
| 2009/0254572 | A1 | 10/2009 | Redich et al. |
| 2010/0030890 | A1 | 2/2010 | Dutta et al. |
| 2010/0241844 | A1* | 9/2010 | Hussain .............. G06F 21/6218 713/150 |
| 2012/0159296 | A1* | 6/2012 | Rebstock ............. G06V 30/413 715/205 |
| 2013/0332985 | A1 | 12/2013 | Sastry et al. |
| 2014/0007186 | A1* | 1/2014 | Agrawal ............. G06F 21/6227 726/1 |
| 2014/0047556 | A1* | 2/2014 | Davis .................. G06F 21/6209 726/28 |
| 2014/0372591 | A1 | 12/2014 | Payette |
| 2015/0088933 | A1* | 3/2015 | Schofield ............ G06F 21/6245 707/779 |
| 2015/0172320 | A1 | 6/2015 | Colombo et al. |
| 2015/0269383 | A1 | 9/2015 | Lang et al. |
| 2015/0286969 | A1 | 10/2015 | Warner et al. |
| 2016/0112453 | A1 | 4/2016 | Martinez et al. |
| 2016/0232370 | A1 | 8/2016 | Rissanen et al. |
| 2016/0364163 | A1* | 12/2016 | Kamble ................ H04L 63/105 |
| 2016/0378999 | A1 | 12/2016 | Panchapakesan et al. |
| 2017/0220813 | A1* | 8/2017 | Mullins .................. G06F 16/93 |
| 2018/0032750 | A1* | 2/2018 | Hammel ............ G06F 21/6218 |
| 2018/0276393 | A1 | 9/2018 | Allen et al. |
| 2018/0367506 | A1 | 12/2018 | Ford et al. |
| 2019/0205403 | A1 | 7/2019 | Hussain et al. |
| 2019/0238467 | A1 | 8/2019 | Guan et al. |
| 2019/0238688 | A1 | 8/2019 | Bermundo et al. |
| 2020/0059494 | A1* | 2/2020 | Annadata ................ H04L 63/20 |
| 2021/0006596 | A1 | 1/2021 | Beredimas et al. |
| 2021/0117517 | A1 | 4/2021 | Bregman et al. |
| 2021/0117562 | A1 | 4/2021 | Balan et al. |
| 2021/0120044 | A1 | 4/2021 | Balan et al. |
| 2021/0342900 | A1 | 11/2021 | Memon |
| 2022/0067731 | A1 | 3/2022 | Palaniappan et al. |
| 2023/0259649 | A1 | 8/2023 | Bregman et al. |
| 2023/0297711 | A1 | 9/2023 | Balan et al. |

FOREIGN PATENT DOCUMENTS

| | | | | |
|---|---|---|---|---|
| WO | WO-2013105076 A1 * | 7/2013 | ......... | G06F 21/6254 |
| WO | WO2015154133 A1 | 10/2015 | | |

OTHER PUBLICATIONS

Hasiba, et al., "A New Hybrid Access Control Model for Multi-domain Systems," 2017 4th International Conference on Control, Decision And Information Technologies (CODIT), IEEE, Apr. 5, 2017, XP033251636, DOI: 10.1109/CODIT.2017.8102687 [retrieved on Nov. 8, 2017], pp. 766-771.

* cited by examiner

ADMINISTRATOR

New Redaction Policy Rules × | Preview

Document > RedactSSNP > Redaction Policies
320

⊕ Add Rule

New_Rule_1

Select Redaction Template
310
[ Social Security Number ▼ ]

This Rule Replaces Social Security Number With
Xxx-xx-xxxx

Document Class:
RedactSSNP
330

☐ Show Labels

Retirement Portfolio Report

Account Id: 74095661274
SSN: XXX-XX-XXXX
Date: 01/22/2019

John Smith
1234 Grant Street
Your Town, IL 10001

Assets In Your Portfolio:

Asset Value:
| | Amount | Portfolio |
|---|---|---|
| Assets In Your Portfolio | | |
| Cash/ Cash Equivalents | 0.00 | 0.0% |
| Money Market Funds | 165.04 | 15.1% |
| Equities/Options | 4,903.10 | 0.5% |
| Mutual Funds | 27,391.65 | 84.4% |
| Closed-end Funds | 0.00 | 0.0% |
| Total Priced Assets: | $32,459.79 | |

Income Summary:
| | Current | YTD |
|---|---|---|
| Income/Receipts | 0.00 | 0.00 |
| Interest | 0.00 | 0.00 |
| Interest-non-taxable | | |

PAGE [1] OF 1

[ SAVE AS ]  [ SAVE ]

ADMINISTRATOR

Redaction Policies
... All Policies > Redact SSN For Retirement

Delete

☐ ≡ Filter Redaction Policies

Displaying 88 of 88

- 📄 Redaction_P2
- 📄 RedactText
- 📄 AC001PDF_Redact
- ☑ 📄 Redact SSN For Retirement
- 📄 12
- 📄 _CWM Redaction
- 📄 123
- 📄 _CWMSS
- 📄 1

_720_

Document Classes

✓ ✗
Apply Reset  Remove Associations
       ✗

Enter Document Class    ∨   [APPLY DOCUMENT]

📄 RedactSSSP

📄 mobius: retirement

MULTI-LAYER REDACTION POLICIES IN DOCUMENTS STORED ACROSS A PLURALITY OF REPOSITORIES

CROSS-REFERENCE TO RELATED APPLICATIONS

This application is a continuation of, and claims priority benefit of, U.S. patent application Ser. No. 17/069,853, filed Oct. 13, 2020, entitled "Federated Redaction of Select Content in Documents Stored Across Multiple Repositories," which claims priority benefit of U.S. Provisional Patent Application Ser. No. 62/923,381, filed on Oct. 18, 2019, entitled "Systems and Methods for a Policies Based Information Governance". All of the aforementioned disclosures are hereby incorporated by reference herein in their entireties including all references and appendices cited therein.

FIELD OF THE TECHNOLOGY

This application relates generally to federated redaction of content (such as documents) and content access control technologies, for content stored in internal and external content repositories.

BACKGROUND

Organizations require broad distribution of documents to fuel basic business operations across many sectors of their business. Different sectors, departments, and users within those contexts all need to work with the document, but will not have the need or authority to be able to see all information within the document. An organization requires a centrally administrable facility for mediating access to specific data within its documents based on user function and document contents.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Provided are methods and systems redacting at least one asset field from at least one document stored in a networked document repository. In some embodiments, a system for redacting at least one asset field from at least one document stored in a document repository may include an application server for processing a plurality of documents, the application server further comprising a plurality of repository interfaces, each of the plurality of repository interfaces connecting to a different document repository storing a plurality of documents. The application server may be further configured to receive an instruction to retrieve a document stored in a document repository of the plurality of document repositories; create a logical page in computer memory to recreate the document stored in the document repository; determine a document class associated with the document stored in the document repository; and based on the associated document class, apply at least one redaction policy to the document in the logical page in computer memory. The system may further comprise an application client computing device in communication with the application server, the application client computing device configured to be utilized by a user to view a displayed redacted logical page on a graphical user interface of the application client computing device.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Exemplary embodiments are illustrated by way of example and not limitation in the figures of the accompanying drawings, in which like references indicate similar elements.

FIG. 3, FIG. 4, and FIG. 5 depict exemplary redaction rule editor graphical user interfaces that may be provided to a human user of the computing system.

FIG. 7 depicts an exemplary graphical user interface that may be provided to a human user of the computing system for associating a document class to a redaction policy.

FIG. 8 depicts an exemplary graphical user interface that may be provided to a human user of the computing system for previewing redacted content as the result of applied redaction policies.

FIG. 11 depicts an exemplary graphical user interface that may be provided to a human user of the computing system for viewing of a document located in an external document repository.

FIG. 13 depicts an exemplary graphical user interface for migrating redaction policies between servers.

DETAILED DESCRIPTION

Figure 1:
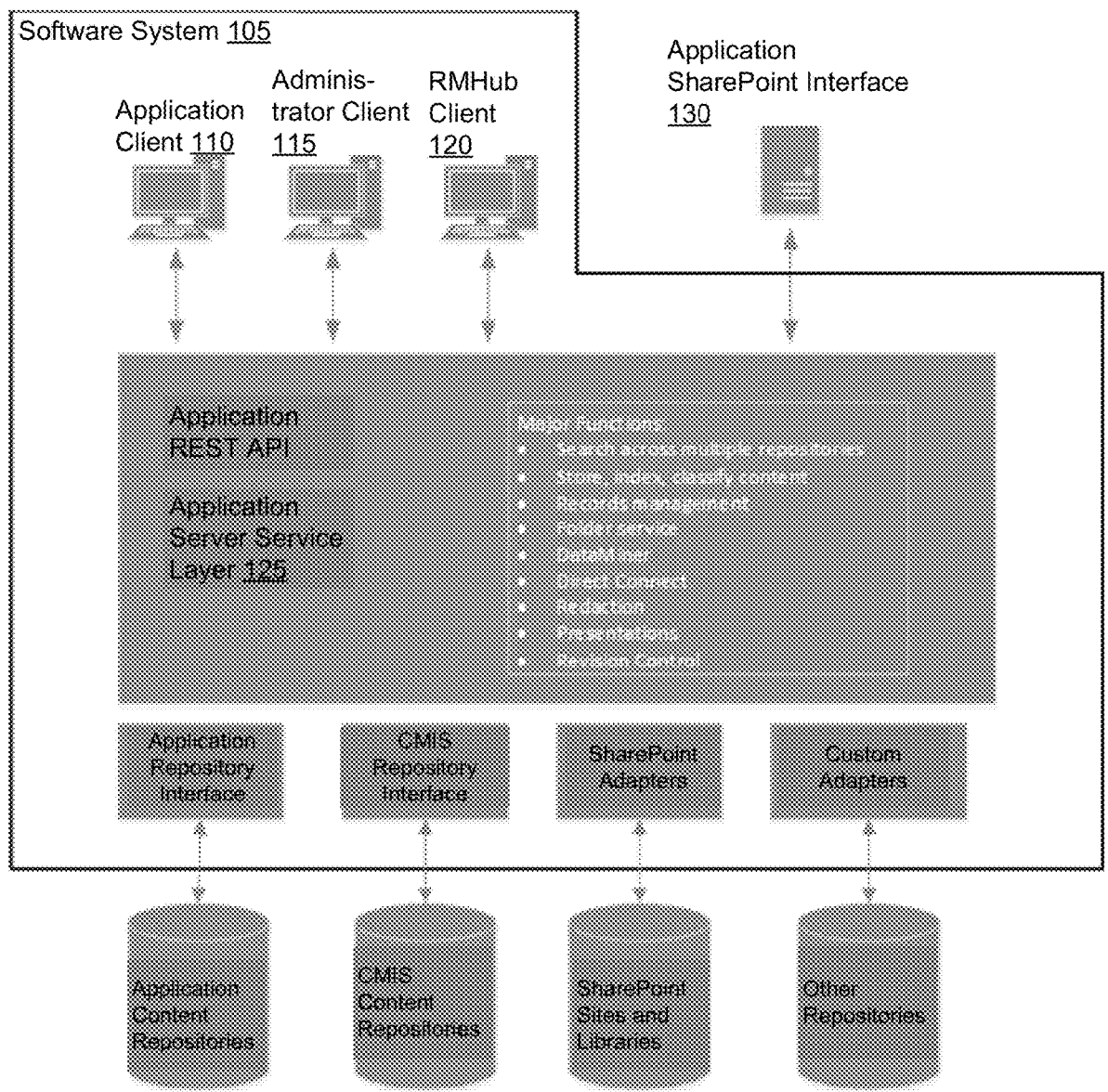
FIG. 1 depicts an exemplary system architecture of a computing system that executes the federated redaction techniques disclosed herein.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, and other embodiments can be formed, by introducing structural and logical changes without departing from the scope of what is claimed. The following detailed description is, therefore, not to be taken in a limiting sense and the scope is defined by the appended claims and their equivalents.

In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The embodiments disclosed herein may be implemented using a variety of technologies. For example, the methods described herein may be implemented in software executing on a special purpose computer system containing one or more computers, or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium, such as a disk drive, or computer-readable medium.

Disclosed herein are systems and methods to mediate document access by various people in an organization. Document access is controlled based on document contents and/or role of the user within the organization. With the presently disclosed federated redaction techniques, a user can utilize a sophisticated redaction policy builder to apply a multi-layer redaction policy to any content, regardless of where that content was originally generated or is presently stored, in substantially real-time. Further, multi-layer access privileges can be defined to who is allowed to see unredacted versions of the content.

With federated redaction as discussed herein, one or more redaction policies can be applied to one or more documents in a simple manner and in substantially real time, based on associating one or more redaction policies to one or more document classes (or groups). That is, a single redaction policy can be applied to all documents of one or more document classes. Also, multiple redaction policies can be applied to all documents of one or more document classes. In previous systems, only one redaction policy could be applied to one document at a time. Thus, federated redaction of documents enables simple, quick, document control of broad swaths of documents.

Further, in embodiments of the presently disclosed federated redaction, redaction can be applied to a plurality of different types of documents, regardless of where the document is generated or stored. That is, the presently disclosed redaction polices can be applied to documents generated or stored in a repository within an organization, or to documents generated or stored in a repository outside of an organization, such as in SharePoint or CMIS (Content Management Interoperability Services). That is, embodiments of the present invention provide for a computing system to take content in any repository connected to a network and apply a sophisticated multi-layer redaction policy to it. Thus, redaction policies can be applied to almost any document, regardless of where the document was generated or is currently stored. In exemplary embodiments, the federated redaction techniques disclosed herein can be applied to any document that is capable of being converted into a PDF (portable document format) file format.

With the federated redaction techniques disclosed herein, a user can specify any type of simple or sophisticated redaction policy to be applied to documents. The policy can be defined in regular expression, or by pattern matching. For example, a user can define a policy by specifying to find a particular character or string of characters. In other embodiments, a user can define a policy by specifying to find a particular field, then search for a character three fields below it and two spaces to the left. In other embodiments, a user can define a policy regarding a particular area of a document, such as a box in the top right corner. Any type of simple or complex redaction policy can be defined by a user.

Further, governance controls provide a multi-layer access privilege that can be simply defined to persons or roles (categories) of persons that have permission to view certain unredacted content in the document, or view the entire document in an unredacted state. A person at one level of privilege may have permission to view certain types of unredacted content but not other types of content. A person at a higher level of privilege may have permission to view more types of unredacted content, or even all content in an unredacted form. For example, a person at a lower level of privilege may be able to see a mailing address in an unredacted form of a document, but not a social security number. A second person at a higher level of privilege may be able to see both a mailing address and a social security number in an unredacted form of the document. Thus, multi-layer access privileges can be defined by the computing system regarding user permissions to view unredacted content.

The embodiments disclosed herein regarding specification of redaction policies, application of redaction policies to documents, specification of governance controls, and application of governance controls to people and documents, can all be applied substantially instantaneously. That is, any change made to a redaction policy is immediately applied to a relevant document within a matter of microseconds. Similarly, any change made to a document class, or user permission is immediately applied to relevant documents. Thus, the document is refreshed almost instantaneously and in real-time without a need to restart the whole computing system.

Traditional computing systems have redaction policies that operate by first creating a copy of the content of a document, and then applying the redaction policy to the document copy. In this system, in order to change a redaction policy applied to a document, a computing system has to reprocess large swaths of content. This is expensive in terms of computing power, memory storage, and causes delayed response times by the computer.

Embodiments of the present disclosure compute the redaction policies on the fly, and thus policies can be flexibly changed without utilizing any additional storage in memory, and without utilizing much extra computer processor capacity. Furthermore, based on underlying core document processing technology for modeling local documents in memory (discussed further herein), a redacted or unredacted document can be presented on a graphical user interface to a user within microseconds, in substantially real-time.

In exemplary embodiments, one or more attributes of documents are used to drive the selection of one or more redaction policies. A redaction policy uses pattern matching algorithms to identify portions of the document to hide from the user. Different users have selective permission to see none, some, or all of the information within the document. Documents within all document repositories within an organization are identified as belonging to a document class. A document class is typically a concept already embedded in an organization's structure based on the function and content of its documents.

The present disclosure further describes associating document classes to redaction policies. A redaction policy can be one of a number of expressions, scripts, or procedures for identifying a specific item of information within a document. Examples of such a piece of information are a social security number, an account code, other personally identifiable information, or information specific to the customer.

At the time of access, the document's document class(es) are retrieved by a processor, and the document and the redaction policies relevant to them are identified and applied. Applying a redaction policy results in the matching data being obscured from the user. Redaction applies to all uses of the document, including but not limited to, viewing, retrieving, printing, emailing, or otherwise distributing. A document may have multiple redactable pieces of information on it. Multiple policies can be applied to the same document class. Documents of a document class may appear in many different repositories and sensitive information may have different formats in any given document or not appear at all. Multiple overlapping policies can be applied to the same document. The effect of applying a policy that does not match a document is that nothing is redacted.

Different users, with different roles, may have access, or be denied access, to different pieces of information in the document. Redaction policies can be associated with user roles so that the application of the redaction policy is optional for a user with that role. Documents can be searched for content using full text indexes that will include all the data on the page. Search expressions are modified so that the full text search terms of a search expression are only applied to documents to which no redaction policies apply.

With embodiments of the present disclosure, a user can create a redaction policy using patterns or regular expression (RegEx); associate a redaction policy to a document class; associate a document class to a redaction policy; preview a document with redaction policies applied; give other user(s) unredacted privilege for a redaction policy using the Authorization page; and view, download, extract, print, and email redacted/unredacted content.

I. System Architecture.

Embodiments of the present disclosure can be implemented in a computing software system connected to a communication network, to facilitate viewing of redacted content over the Internet, or over an enterprise's intranet network. With the present invention, archived content can be retrieved, redacted, and presented for viewing by a user, regardless of where that archived content is stored across any accessible repository. With this invention, a user can more easily and more efficiently retrieve, view, and redact archived content. While the present disclosure refers chiefly to "documents", the same or similar techniques are applicable to other types of content that may be stored in a repository, such as spreadsheet, image, database, etc.

In traditional systems, when a document is archived in a document repository, each page of that document is individually processed. Further, the document is typically archived in accordance with an archive policy. However, embodiments of the present invention allow for any associated document in any file format (such as .bmp, .img, .png, .doc, .txt, .rtf, .xls, .ppt, etc.) to be archived without a special archive policy. In addition, the entire file is processed as one entity, instead of each page being individually processed. When the document file is fetched from a server, a processor does not know how many pages are in there or any other particularities of the document content.

In exemplary embodiments, some document files can be rendered as an image, and then can be transformed and manipulated from there. In other embodiments, such as documents from external repositories, that cannot be done because very little information is known about the nature of the document—it is merely one entity. However, the presently disclosed redaction policies can still be applied in both scenarios.

In exemplary embodiments, the computing software system may have three components in communication with one another—a document repository at a backend that contains archived documents; a view server in the middle where the business logic on the stored information is conducted, and a user interface application where a user can view information from a webpage.

Typically document redaction policies are stored in a document repository itself, in the backend. With the presently disclosed technology, redaction policies are stored and executed from the view server in the middle. The view server connects to the backend document repository of the computing software system itself, and is also capable of communicating with other document repositories that are external to the computing software system and/or enterprise. Thus, a document can be retrieved and redacted in accordance with the present disclosure, across any document repository within the computing software system and also from an external, third party controlled document repository (such as Microsoft SharePoint, CMIS, etc.). As used herein, CMIS refers to Content Management Interoperability Services, an open standard that allows different content management systems to inter-operate over the Internet. Specifically, CMIS defines an abstraction layer for controlling diverse document management systems and repositories using web protocols.

FIG. 1 depicts an exemplary system architecture of a computing system that executes the federated redaction techniques disclosed herein. In exemplary FIG. 1, software system 105 has an application client 110, an administrator client 115, and a hub client 120, each communication with an application REST API in the application server service layer 125. As would be understood by persons of ordinary skill in the art, there may be fewer or additional components than these depicted in exemplary FIG. 1.

The application client 110 enables end-users to search for and display content stored anywhere in the enterprise, providing users with an easy to use interface that simplifies locating documents. It offers simultaneous viewing of multiple diverse documents and flexible viewing options. The application client 110 further enables end-users to view records stored in CMIS repositories through native viewers.

Administrator client 115 is a centralized, browser-based client for administering the software system 105. The software system 105 exposes application logic to other sites and applications through a Representational State Transfer (REST) API, in the application server service layer 125.

The application server service layer is configured to perform one or more of a multitude of functions, including: federated searches across enterprise content in multiple repositories; archiving, indexing, and classification of enterprise content; management of indexes for enterprise content; redaction—mask sensitive data returned for viewing by repositories, based on the user permissions; and presentations—add formatting and navigation instructions such as bookmarks, hyperlinks, and overlays to retrieved documents for display in the viewing client. Users can be enabled to download data extracted from retrieved documents, or highlight sections of retrieved documents that satisfy search requests.

The application server service layer is further configured for one or more of: records management—enables a user to perform records management tasks such as setting retention and setting event-based records retention; revision control—enables end users to create new revisions of a specific document in support of document collaboration related use cases; folder service—predefined, automatic, and built-in folders for enterprise content, as part of records management or outside it. Enterprise folders allow for a presentation of a corporate folder structure to users.

Additionally, the application service layer is further configured for one or more of: Data Miner—End-users can print or download data that they extract from stored documents, using a predefined policy or the policy editor to define the extraction; extracted data can also be used to automatically create reports; Direct Connect—Allows end-users to access content directly, without using the application client 110 interface to browse or search. It allows an administrator to construct URLs for users that provide direct access to stored documents.

Software system 105 also includes interfaces to connect with other computing components, including an application SharePoint interface 130. Through this interface, a user can manage and share content in SharePoint 2013, 2016, 2019 and SharePoint Online through content repositories; expand SharePoint storage capacity; enforce retention and storage policies, and improve business processes and operations across an organization.

The functions described herein for software system 105 are packaged together in a single solution that an enterprise can implement quickly and easily, without any programming. Customization and configuration of application services is completely GUI (Graphical User Interface) based. Once configured, there is no ongoing maintenance or administration, and any consumer in the enterprise can re-use the services.

In exemplary embodiments, software system 105 can deliver information to consumers in a number of different ways: rendered in the original format; rendered based on file associations for viewing in its native client application (such as Microsoft Word or Adobe Acrobat); and/or rendered automatically into Web-friendly formats for Web viewing (such as HTML or JPEG).

Software system 105 may also have various repository interfaces and adapters, such as those depicted in exemplary FIG. 1, to connect with repositories for federated content. In other embodiments there may be fewer or additional interfaces and adapters than those depicted in the figure.

Exemplary FIG. 1 depicts repositories for federated content; application content repositories for open and mainframe systems; CMIS content repositories—for any CMIS-compatible content repository, for example, IBM FileNet P8, Alfresco, and EMC Documentum; SharePoint sites and libraries—to provide access to content in any version of SharePoint and SharePoint Online. Since OneDrive for Business libraries are backed by SharePoint sites, the adapter can also be used to search for and view content from OneDrive for Business libraries. Custom adapters may also be implemented to integrate with any other repository.

In various embodiments, software system 105 provides a content viewing product, with an intuitive and innovative Web user interface. It enables users to access documents in an organization without the need to deploy software on their desktops. They can access documents and images by browsing through content folders, or by leveraging new or saved searches on all topics. The software system 105 eliminates the need for client Java applets and plug-ins, improving user experience, security, administration, and maintenance.

Further, software system 105 enables users to search for, display, and archive content from multiple, disparate sources. Content is anything that one can access or archive through the software system 105, including, but not limited to, Web content, documents, reports, records, transactions, bills, statements, payments, correspondence, image files, database files, customer profiles, and media files.

For example, assume that claims adjusters for an insurance company require simultaneous retrieval of information, including claim forms, medical reports, police reports, and digital videos and pictures. The information can reside in any sources, including custom sources. When the claims adjusters submit their searches from the application, software system 105 integrates the information in these sources into a consolidated set of search results from which they can retrieve individual items. If they need to place a hold on all content related to an accident claim, they can archive the content in a source that supports holds and assign a new retention date.

II. Introduction of Document Class

As used herein, the term "document class" refers to a classification of a group of documents, where the classification is applicable across one or more document repositories. For example, the repositories can be VDR (View Direct Repository), MVS (operating system a repository runs on), SharePoint and CMIS, though other repositories are also within the scope of this disclosure. For example, a document class can be 'account statements' in a bank. Another document class may be 'tax statements' in a bank. Thus, a document class may be a type of a document. For VDR and MVS repositories, each report ID (identifier) is a document class. Typically a document class is assigned to a document before the document can be archived.

An exemplary redaction policy may be that account numbers should be redacted. If that redaction policy is applied to the document class "account statements", then all account numbers in all account statements at a bank in all the connected document repositories will be automatically redacted substantially instantaneously. In this way, federated redaction is achieved for documents located in disparate data storage types and locations. In exemplary embodiments, federated redaction is supported for LPFD and text for VDRNet policy archive or for VDRMVS REPTPROC archive; for associated PDF and Text (for VDR list archiving); and PDF and Text documents for SharePoint and CMIS. As used herein, VDRNet is a server where documents are archived, sometimes referred to herein as a repository.

Figure 2:
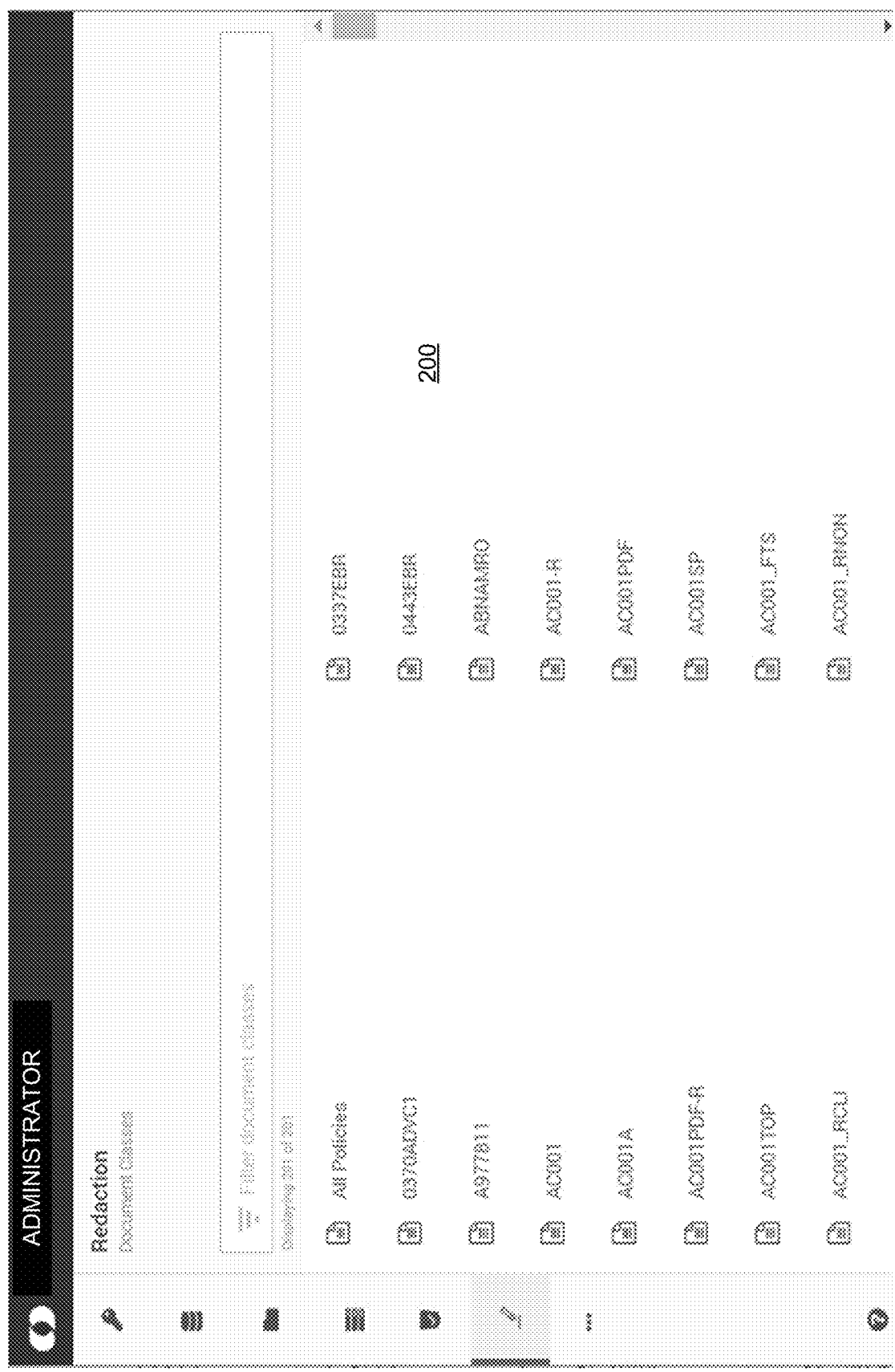
FIG. 2 depicts an exemplary redaction graphical user interface for document classes that may be provided to a human user of the computing system.

FIG. 2 depicts an exemplary redaction graphical user interface 200 that may be provided to a human user of the computing system. The exemplary redaction interface shows all of the document classes from document repositories that have redaction enabled. Selection of a document class from the user interface displays a list of associated redaction policies for that document class, which is typically a subset of all available redaction policies. Selecting "All Policies" from the user interface shows a global list of redaction policies that exist in the system as a whole. These redaction policies may be applied to any document class. In exemplary embodiments, a filter box is also provided to allow a human user to search for a specific document class.

As would be understood by persons of ordinary skill in the art, there may be additional or fewer fields present on a redaction graphical user interface in other embodiments, than those depicted in FIG. 2.

III. Redaction Rule Editor

FIG. 3 depicts an exemplary redaction rule editor graphical user interface 300 that may be provided to a human user of the computing system. As would be understood by persons of ordinary skill in the art, there may be additional or fewer fields present on the graphical user interface 300 in other embodiments, than those depicted in exemplary FIG. 3.

In the exemplary graphical user interface 300, redaction rules may be created, edited, or deleted. A simple way to create a redaction policy is to use a redaction template. The template specifies what and how to redact a document. In the exemplary graphical user interface 300 of FIG. 3, a redaction template 310 is shown. The redaction template 310 is for a social security number, and the rule specifies that a social security number in a document is replaced by "XXX-XX-XXXX". A user can change a particular rule as desired. For example, a user may specify to change a social security number (or any other content in a document) to any other desired character, such as to any one or more of a number, letter, or symbol instead of the letter "X". Alternatively, a user may specify to remove any characters in a document (numbers, letters, symbols) and replace with blanks.

A field 320 is also provided on graphical user interface 300 to allow a user to add a new redaction rule, with or without a redaction template. In exemplary embodiments, redaction rules look for a specific pattern of characters and/or relative position of characters to one another, regardless of text font.

Redaction rules may be specified by absolute positioning, or relative positioning. For example, a redaction rule may specify to search for a particular character pattern in a specific row, column, or row and column combination. If the character pattern exists at that location, then apply the redaction rule to redact the character pattern from the document. In other embodiments, a redaction rule may specify to "draw" a logical box on a document page at a specified location or around specified text. The redaction rule may specify to search for a matching character pattern within the box, and redact the character pattern if found.

In some embodiments, a preview pane 330 is also provided, to show a preview of what a document may look like after the selected redaction policy is applied. In the preview pane 330 of FIG. 3, the field "SSN" now says "XXX-XX-XXXX". All other fields of the document remain the same, since that is the only redaction policy applied thus far.

In exemplary embodiments, the document provided in the preview pane 330 is a logical rendering of a document. For example, in the exemplary case of a PDF document, the computing system takes the PDF instructions and renders a logical page in memory to get a model in memory of a page that looks exactly like the original PDF document. That is, instead of calling the actual stored document from memory, a logical rendering of the stored document is created by the computing system and displayed in the preview pane 330.

The computing system then applies a redaction rule, such as one defined in field 320, and matches it against its rendering of a logical page. If there is a match on the rendered logical page of text that appears in the format of the redaction rule, then the appropriate redaction rule is applied to that rendered logical page and shown to the user in the preview pane 330.

Figure 4:

FIG. 4 depicts an exemplary redaction rule editor graphical user interface 300 that may be provided to a human user of the computing system. As would be understood by persons of ordinary skill in the art, there may be additional or fewer fields present on the graphical user interface 400 in other embodiments, than those depicted in exemplary FIG. 4.

In the exemplary graphical user interface 400 of FIG. 4, a "simple pattern replacement" redaction template is selected. With this template, a user can use a simple pattern to look for matching strings to redact in a document. In some embodiments, a preview pane 410 is also provided, to show a preview of what a document may look like after the selected redaction policy is applied.

Figure 5:
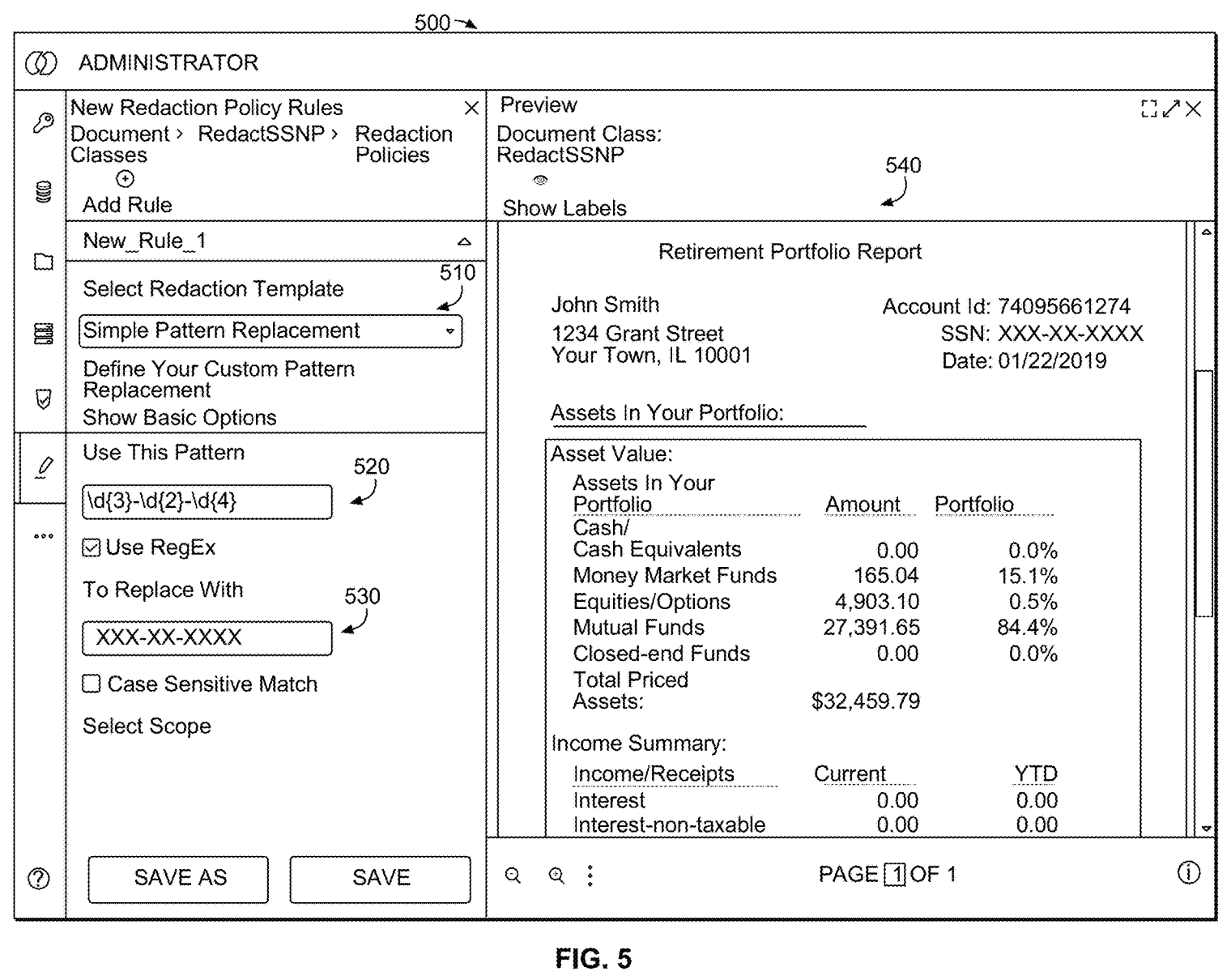

FIG. 5 depicts an exemplary redaction rule editor graphical user interface 500 that may be provided to a human user of the computing system. As would be understood by persons of ordinary skill in the art, there may be additional or fewer fields present on the graphical user interface 500 in other embodiments, than those depicted in exemplary FIG. 5.

In the exemplary graphical user interface 500 of FIG. 5, a "simple pattern replacement" redaction template is selected from a redaction template selection menu 510. With this template, a user can define a simple pattern for the computing system to search for matching strings to redact in a document.

In the pattern definition field 520, a user has a defined a pattern to be "/d(3)-/d(2)-/d(4)". With this pattern, the computing system searches for a pattern defined by three digits, a dash, two digits, a dash, and then four more digits. When this pattern of numbers is found in a document, the pattern is replaced with "XXX-XX-XXXX", as defined by the pattern replacement field 530.

As would be understood by persons of ordinary skill in the art, any type of pattern can be defined in the pattern definition field 520. For example, a user may specify to look for text "Account number:" and then redact everything following that text in the same line. In another example, a user may specify to redact text that appears in the format of a US address. In the case of a US address, a redaction rule may specify the pattern to search for in a document as four digits (for a house number), then a space, then text in a first line, text in a second line, followed by a space and then five digits (for the zip code). In this manner, any type of character pattern can be defined in pattern definition field 520.

FIG. 5 also depicts that a user may define a redaction rule using regular expression (RegEx). With regular expression, any arbitrary pattern of characters can be defined by a user. The computing system searches a document for the specified pattern of characters and redacts any matches found in the document. In this way, any custom field, text, or character can be searched for and redacted in a class of documents, not just common fields like Name, Address, Account Number, Social Security Number, phone number, etc.

In some embodiments, a preview pane 540 is also provided, to show a preview of what a document may look like after the selected redaction policy is applied.

IV. Association of Policies and Document Classes

Figure 6:
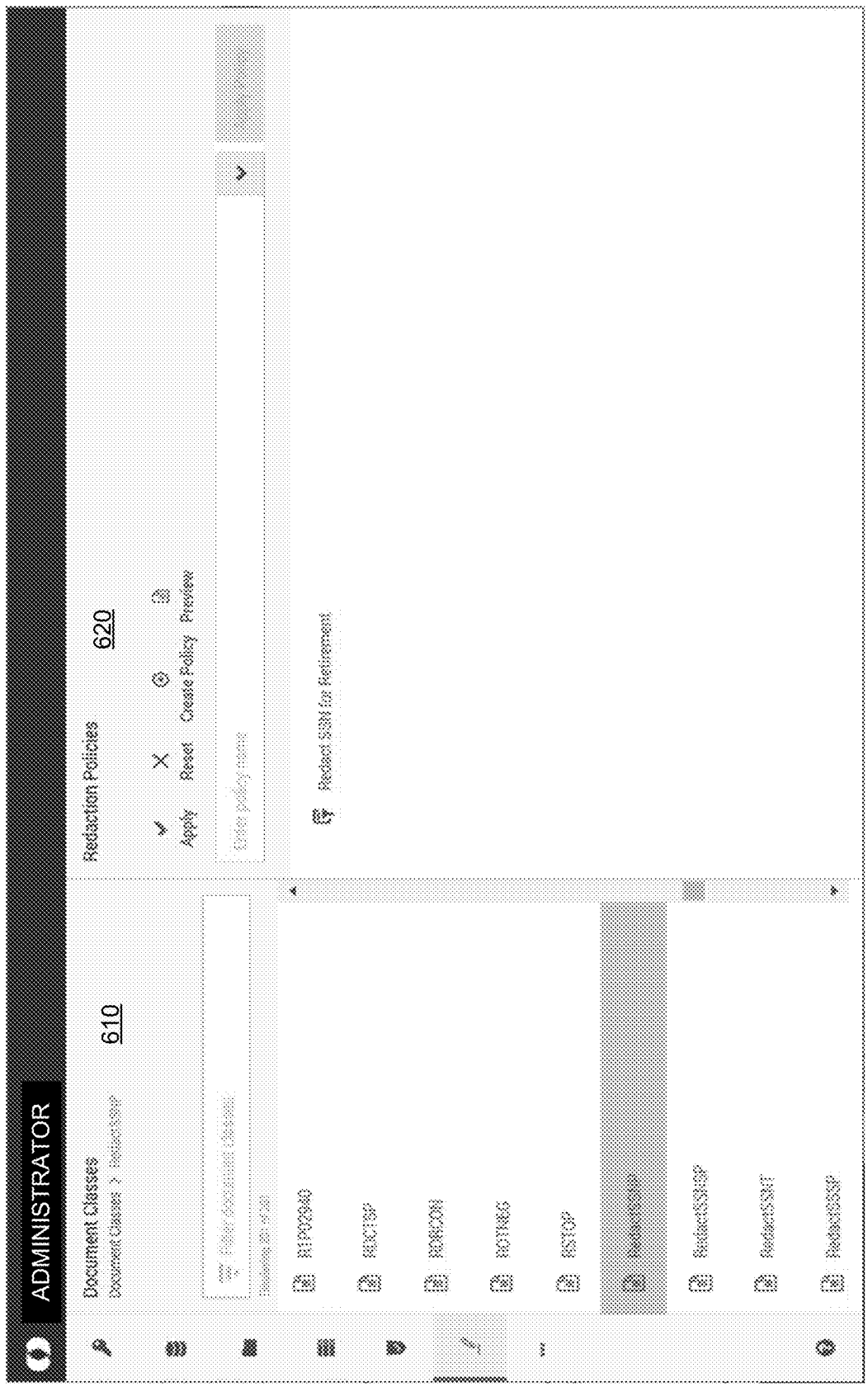
FIG. 6 depicts an exemplary graphical user interface that may be provided to a human user of the computing system for associating a redaction policy to a document class.

As discussed herein, a user may associate any redaction policy to be applied to any one or more document classes. FIG. 6 depicts an exemplary graphical user interface 600 that may be provided to a human user of the computing system for associating a redaction policy to a document class. As would be understood by persons of ordinary skill in the art, there may be additional or fewer fields present on the graphical user interface 600 in other embodiments, than those depicted in exemplary FIG. 6.

In the exemplary graphical user interface 600, a list of document classes is provided in the document classes panel 610 depicted on the left. For any selected one or more document classes, a user can add policies to create associations with it from the redaction policies panel 620 depicted on the right. A user can enter a policy name directly from a search box, or can select a policy from a drop-down menu, and then select "apply policy" to create the association. The policies depicted in the redaction policies panel 620 may be all policies that exist in the computing system, or any subset of the policies that exist in the computing system. Exemplary FIG. 6 shows that a document class of "RedactSSSP" is selected in the document classes panel 610. A redaction policy of "Redact SSN for Retirement" is selected in the redaction policies panel 620, to apply to the selected document class. With this redaction policy, a social security number is redacted for retirement related documents present in the applicable one or more document repositories.

An alternate way to create associations between document classes and redaction policies, is to first select a redaction policy and then associate it with one or more document classes. FIG. 7 depicts an exemplary graphical user interface 700 that may be provided to a human user of the computing system for associating a document class to a redaction policy. As would be understood by persons of ordinary skill in the art, there may be additional or fewer fields present on the graphical user interface 700 in other embodiments, than those depicted in exemplary FIG. 7.

In the exemplary graphical user interface 700, a list of redaction policies is provided in the redaction policies panel 720 depicted on the left. For any selected one or more redaction policies, a user can associate any one or more document classes to it from the document classes panel 710 depicted on the right. A user can enter a document class name directly from a search box, or can select a document class from a drop-down menu, and then select "apply document" to create the association. Exemplary FIG. 7 shows that a redaction policy of "Redact SSN for Retirement" is selected in the redaction policies panel 720. A document class of "RedactSSSP" is selected in the document classes panel 710, to apply to the selected redaction policy. With this redaction policy and document class association, a social security number is redacted for retirement related documents present in the applicable one or more document repositories.

V. Preview of Document with Redaction Policies Applied

Figure 8:
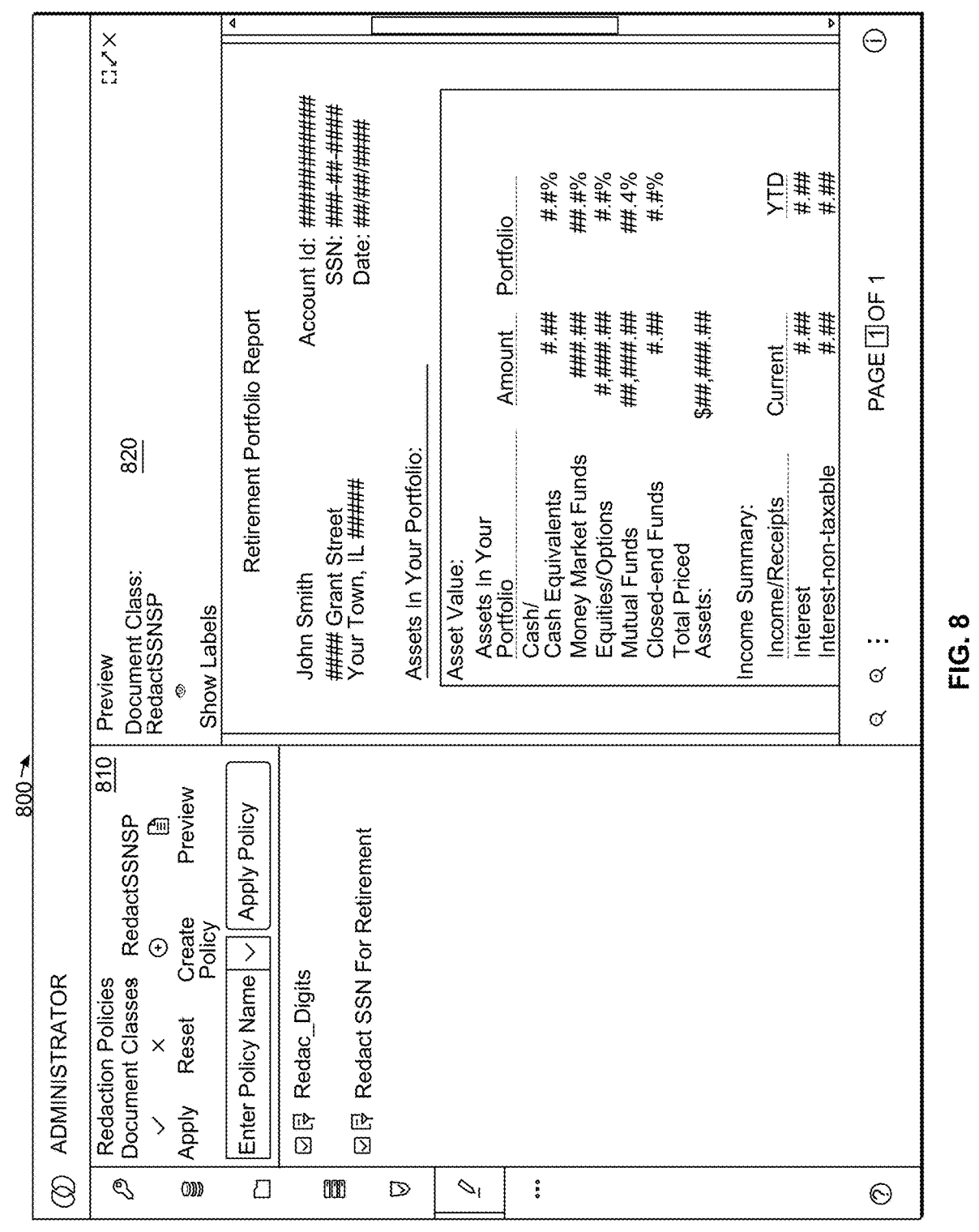

FIG. 8 depicts an exemplary graphical user interface 800 that may be provided to a human user of the computing system for previewing redacted content as the result of applied redaction policies. As would be understood by persons of ordinary skill in the art, there may be additional or fewer fields present on the graphical user interface 800 in other embodiments, than those depicted in exemplary FIG. 8.

From a preview pane 820, a user can see redacted content as a result of applied redaction policies. The applied redaction policies are shown in the redaction policies panel 810. A user can select one or more policies from the redaction policies panel 810 to preview in preview pane 820 the redacted content for all applied redaction policies or a subset of the redaction policies.

In the exemplary embodiment of FIG. 8, two redaction policies are selected in redaction policies panel 810: "Redac_Digits" and "Redact SSN for Retirement". The effect of applying these two policies on document content is shown on an exemplary document in the preview pane 820. The previewed document shows that all numbers in the document have been replaced with the "#" symbol, including in the Account ID field, SSN, Date, mailing address, and the dollar amounts for assets and income.

VI. Authorization to Assign Users and Groups with Unredacted Privilege.

Figure 9:
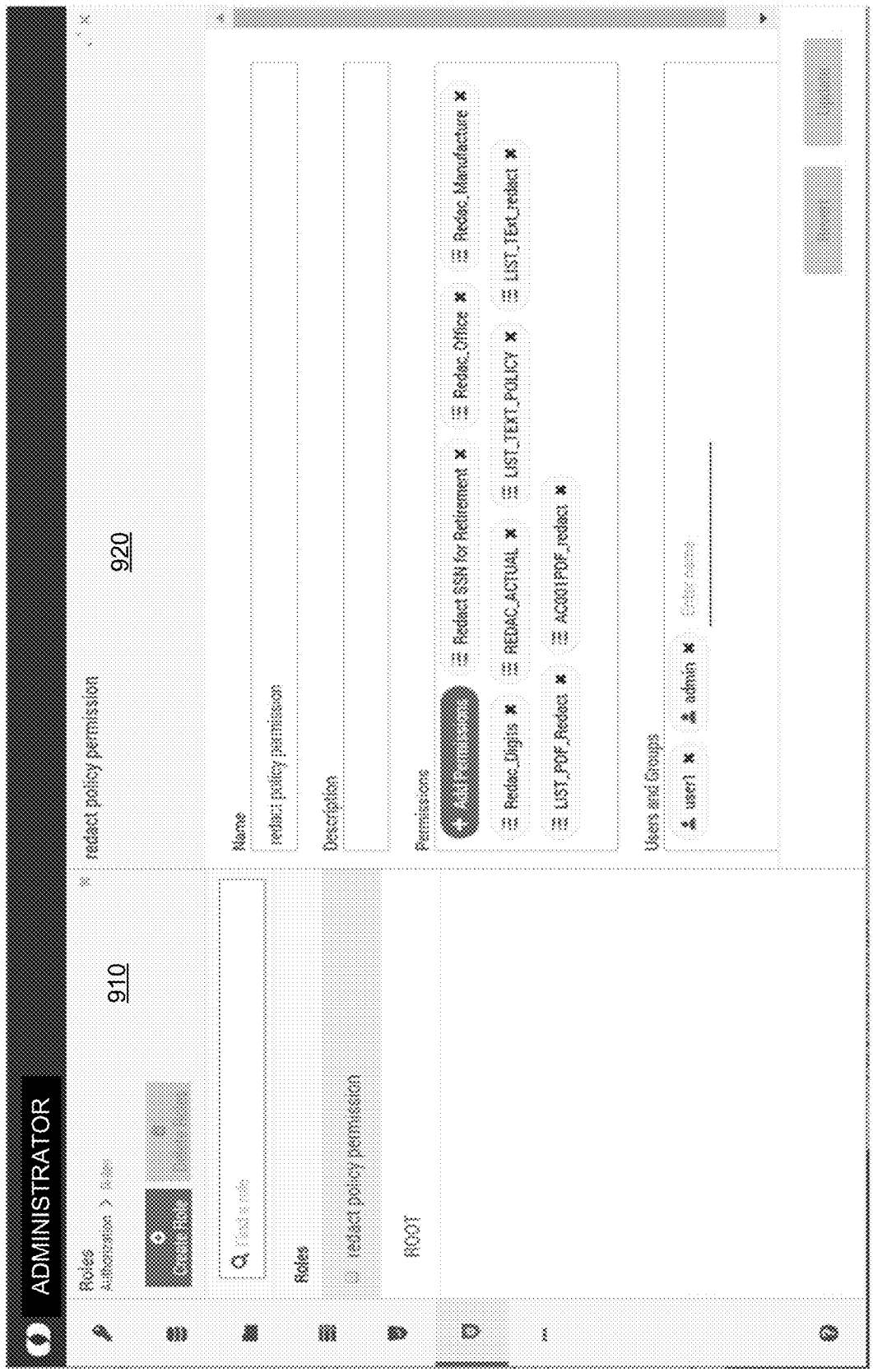
FIG. 9 depicts an exemplary authorization graphical user interface that may be provided to a human user of the computing system.

FIG. 9 depicts an exemplary authorization graphical user interface 900 that may be provided to a human user of the computing system. As would be understood by persons of ordinary skill in the art, there may be additional or fewer fields present on the authorization graphical user interface 900 in other embodiments, than those depicted in exemplary FIG. 9.

From the authorization graphical user interface 900, certain users and groups can be designated to have privilege to retrieve the unredacted content of a redacted document. Each redaction policy is considered as a permission, in the authorization system.

In the exemplary FIG. 9, first a role is created in the role panel 910. The exemplary role panel 910 depicts a role of "redact policy permission". A user may search for an existing role from a search box in role panel 910, create a new role, or delete an existing role. In exemplary embodiments, a user may be assigned a role of an "accountant", "HR", "Finance", "Admin", etc.

From the role permission panel 920, the name of the role can be added, edited, or deleted. A description of the role can also be added, edited, or deleted. Further, specific permissions associated with the role can be added, edited, or deleted. Users and groups can also be associated with the role, or removed from an association with the role. In the exemplary FIG. 9, the "permissions" field lists redaction policies that are applicable to the defined role of "redact policy permission". Further, "user1" is assigned to the specified role, along with an admin user or group.

With this combination of fields shown in FIG. 9, "user1" and "admin" have permission to view unredacted content in a document when any of the specified redaction policies listed under the "permissions" field are applied to a document.

Figure 10:
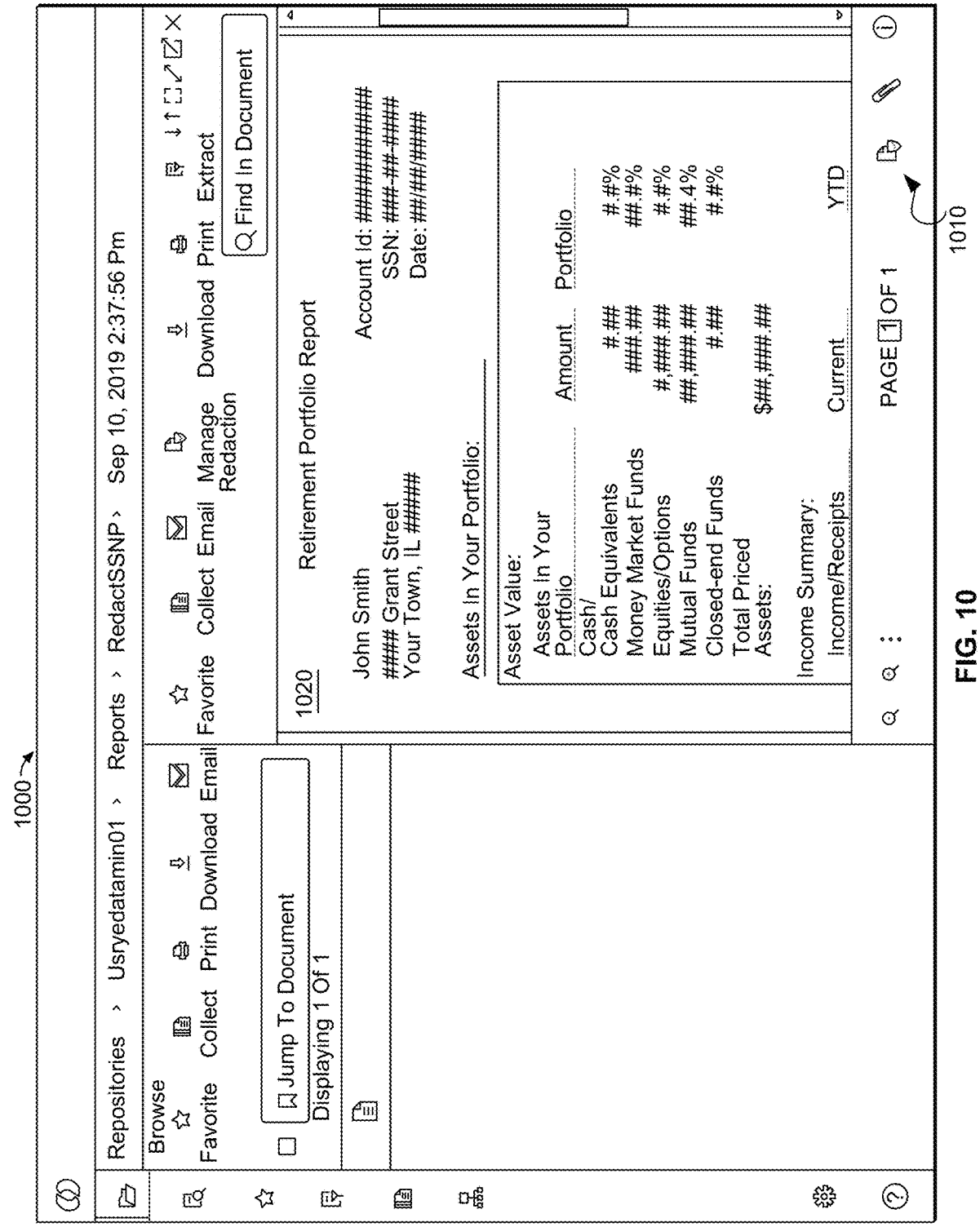
FIG. 10 depicts an exemplary graphical user interface that may be provided to a human user of the computing system for viewing of content.

If there are policies associated with the document class that a document belongs to, opening the document will show the redacted content by default, for any document in any of the document repositories present for an enterprise computing system. FIG. 10 depicts an exemplary graphical user interface 1000 that may be provided to a human user of the computing system for viewing of content. As would be understood by persons of ordinary skill in the art, there may be additional or fewer fields present on the graphical user interface 1000 in other embodiments, than those depicted in exemplary FIG. 10.

If the user has unredacted privilege assigned to him or her in the Authorization system (as discussed above with reference to FIG. 9), selection of the redaction icon 1010 on the lower right corner of the document will allow the user to view the document without content redacted in the document viewer pane 1020. The same functionality is provided to other actions regarding the document, such as downloading, printing, emailing, and extracting the document. This is because when a redaction policy is applied to a rendering of a logical page of a document on a computing device (such as a server), the logical page is re-rendered with the applied redaction policies. Thus, the refresh or re-rendering of the logical page is the same action that occurs regardless of whether a user wishes to view, download, print, email, or extract a document.

Figure 11:
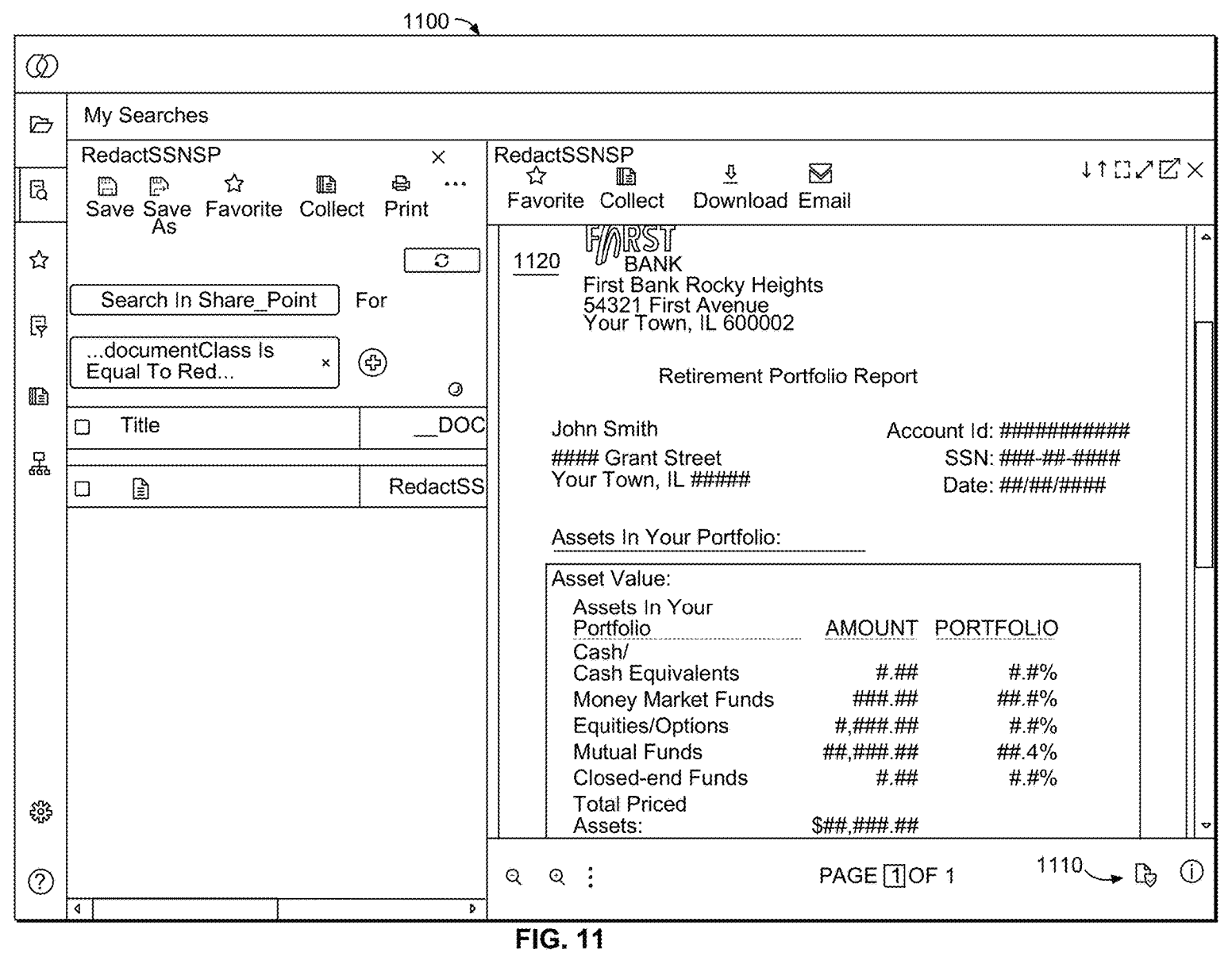

Similarly, if there are policies associated with the document class that a document belongs to for any document in a document repository external to an enterprise computing system (such as SharePoint), opening the document will still show the redacted content by default in a document viewer. FIG. 11 depicts an exemplary graphical user interface 1100 that may be provided to a human user of the computing system for viewing of a document located in an external document repository. As would be understood by persons of ordinary skill in the art, there may be additional or fewer fields present on the graphical user interface 1100 in other embodiments, than those depicted in exemplary FIG. 11.

If the user has unredacted privilege assigned to him or her in the Authorization system (as discussed above with reference to FIG. 9), selection of the redaction icon 1110 on the lower right corner of the document will allow the user to view the document without content redacted in the document viewer pane 1120. The same functionality is provided to other actions regarding the document, such as downloading, printing, emailing, and extracting the document, as discussed herein.

Figure 12:
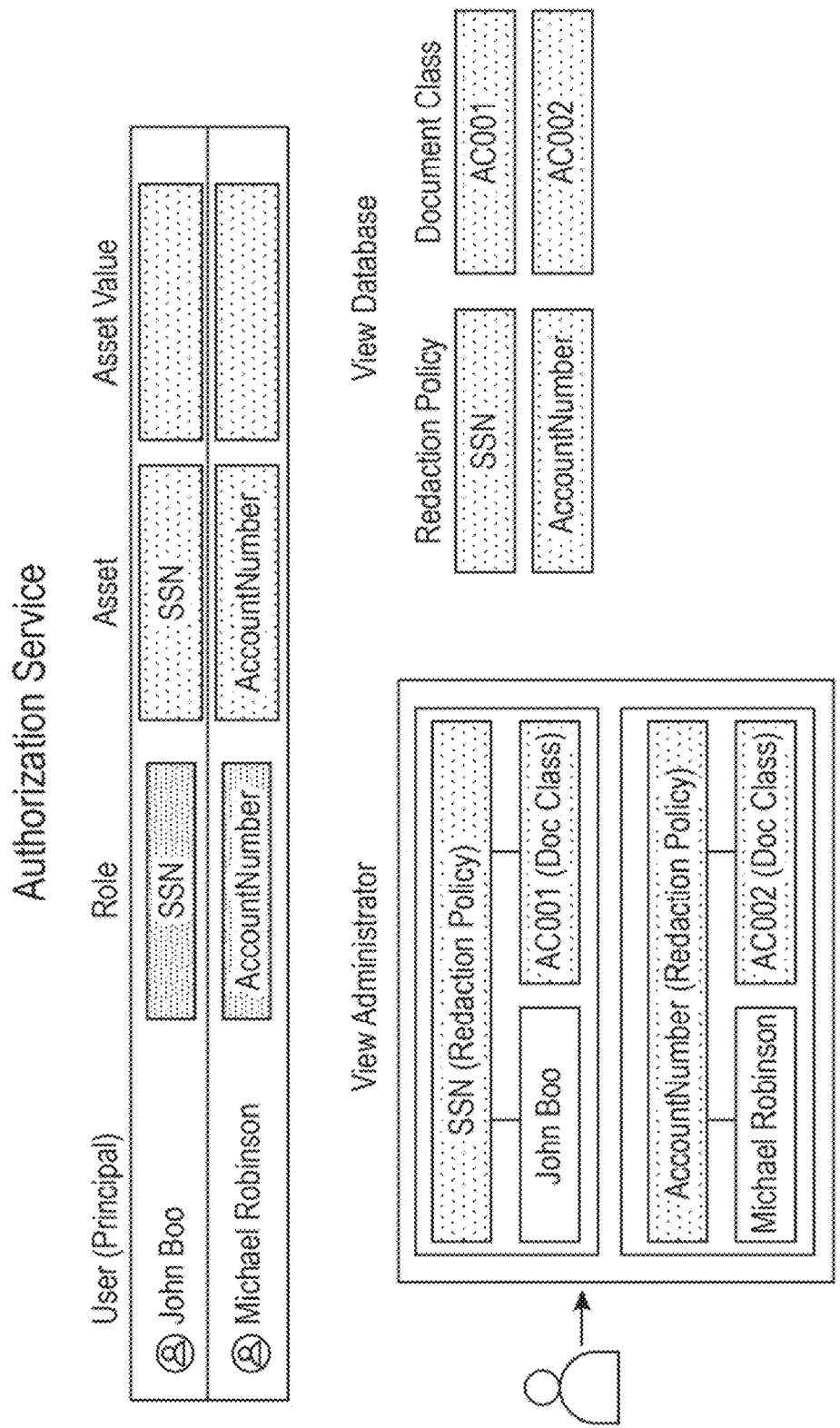
FIG. 12 depicts an exemplary summary of embodiments discussed herein.

FIG. 12 depicts an exemplary summary of embodiments discussed herein. In FIG. 12, a user John Boo is assigned the role of "SSN", which allows him to see the "asset" of a social security number in an unredacted form, even though a redaction policy may be applied to a document for a social security number. A second user, Michael Robinson, is assigned a role of "AccountNumber", which allows him to see an asset of an account number in an unredacted form, even though a redaction policy may be applied to a document for an account number. These permissions can be customized, per the Authorization process discussed above.

Further, an Administrator can see that an asset of a social security number has a redaction policy associated with it, which is applied to documents of a document class AC001, but John Boo can see the unredacted version. An asset of an account number has a redaction policy associated with it, which is applied to documents of document class AC002, but Michael Robinson can see the unredacted version without that particular redaction policy applied.

VII. Migration of Redaction Policies.

Figure 13:
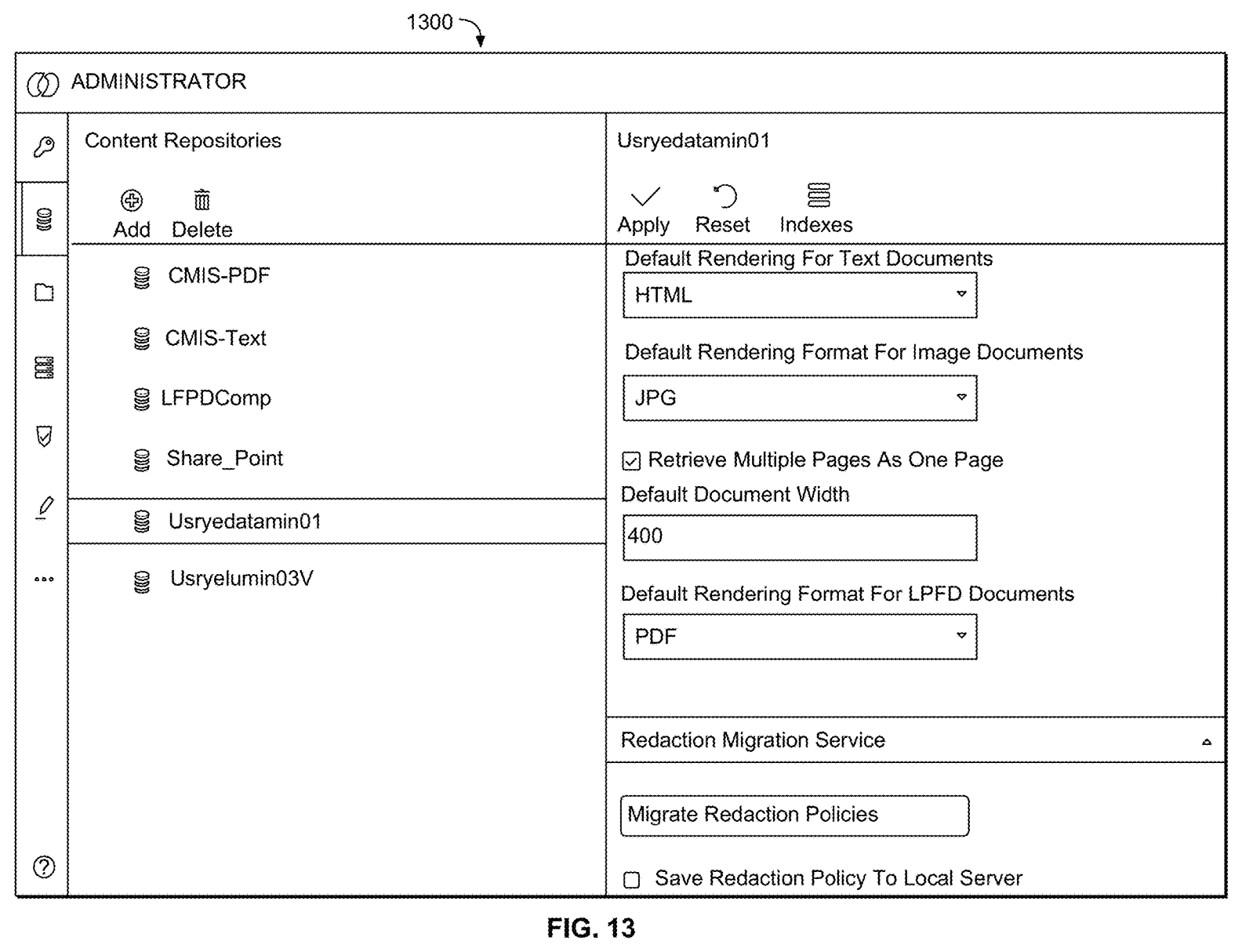

Redaction policies that exist as part of one document repository for one software system can be migrated to a central server by selecting a "migrate redaction policies" button on a graphical user interface, such as the exemplary graphical user interface 1300 of FIG. 13. As would be understood by persons of ordinary skill in the art, there may be additional or fewer fields present on the graphical user interface 1300 in other embodiments, than those depicted in exemplary FIG. 13.

The migrated policies are treated as if they are federated redaction policies, which means they can be applied to any document in any document repository of any software system that is communication with the central server. Policies created through federated redaction can also be migrated into a server for one specific software system by selecting a checkbox on the graphical user interface 1300 to save redaction policy to local server.

VIII. Flow of Information.

Figure 14:
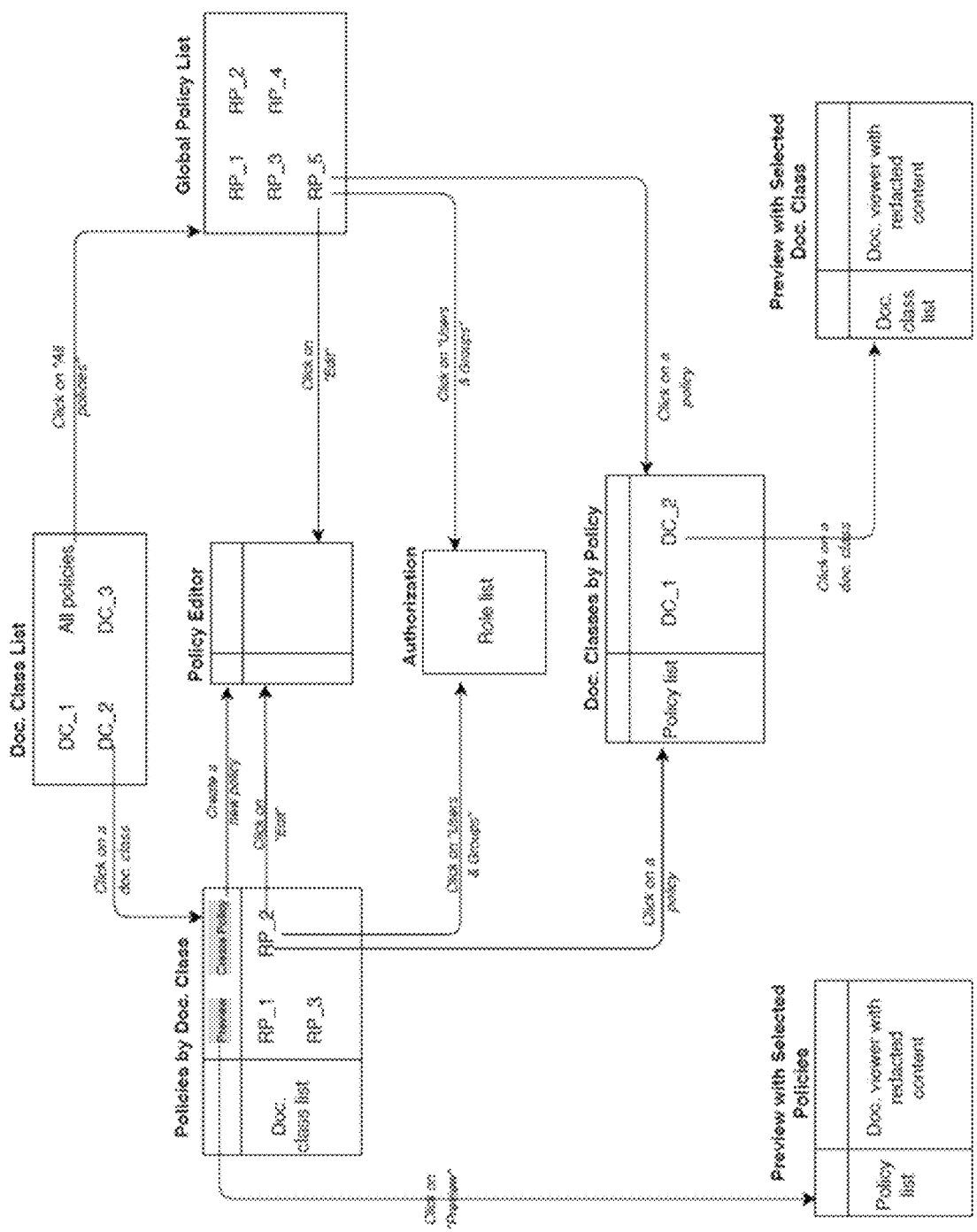
FIG. 14 depicts an exemplary flow of information for a computing system implementing embodiments of the present invention.

FIG. 14 depicts an exemplary flow of information for a computing system implementing embodiments of the present invention. A policy editor is used to create or edit a redaction policy. Document classes are specified, policies are associated with document classes, authorization roles are defined, and a preview is provided with the redaction policy applied to document(s).

Figure 15:
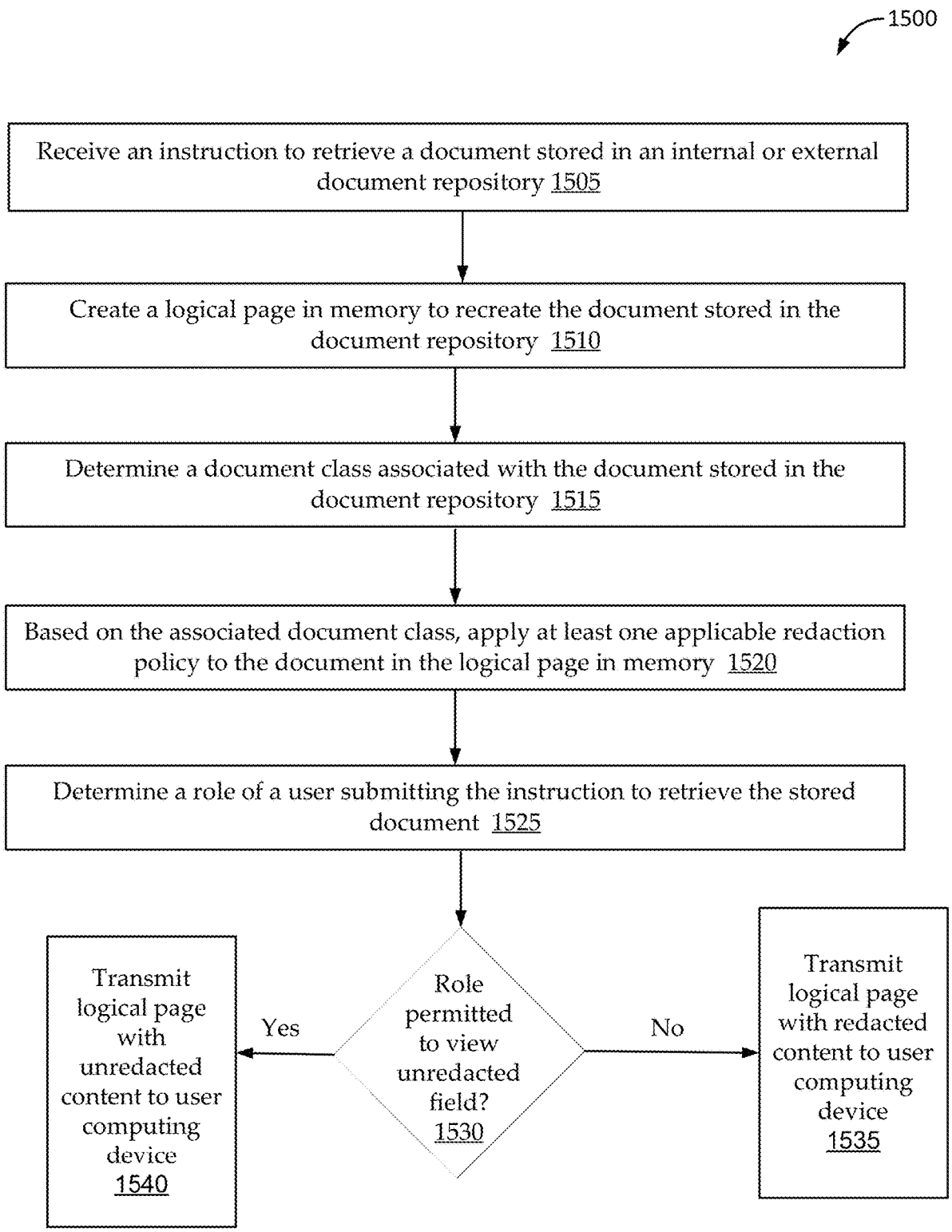
FIG. 15 depicts an exemplary method of implementations of the present disclosure, executed by a processor of a computing server.

FIG. 15 depicts an exemplary method 1500 of implementations of the present disclosure, executed by a processor of a computing server. As would be understood by persons of ordinary skill in the art, there can be fewer or additional steps in various embodiments, than those depicted in the exemplary figure. Further, steps may be performed in varying orders than that depicted.

In step 1505, a processor receives an instruction to retrieve a document stored in an internal or external document repository accessible to the processor. In step 1510, the processor creates a logical page in memory to recreate the document stored in the document repository. A document class associated with the stored document is determined in step 1515. The document class may be determined from metadata associated with the document, or may be retrieved from a database, in exemplary embodiments.

In step 1520, at least one applicable redaction policy is applied to the logical page, the redaction policy applied based on an associated document class. In step 1525, a role of a user submitting the instruction to retrieve the stored document to the processor is determined. If that role is permitted to view a particular unredacted field based on step 1530, then the processor of the computing server transmits the logical page with unredacted content to a user computing device in step 1540. If the role is not permitted to view a particular unredacted field based on step 1530, then the processor of the computing server transmits the logical page with redacted content to a user computing device in step 1535. The logical page is then displayed to a user on a graphical user interface of the user computing device.

IX. Exemplary Computing System.

Figure 16:
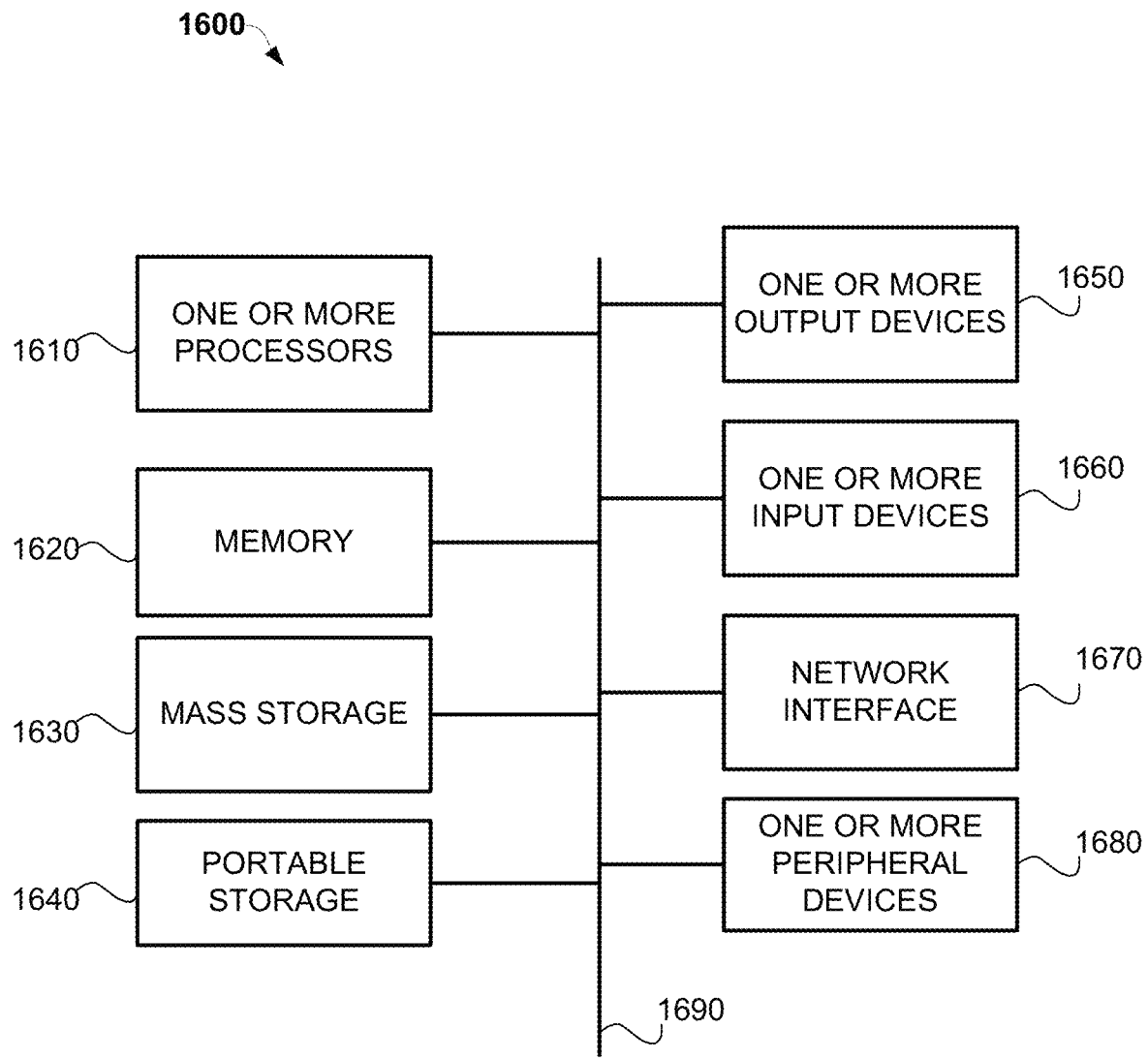
FIG. 16 illustrates an exemplary computing system that may be used to implement embodiments described herein.

FIG. 16 illustrates an exemplary computing system 1600 that may be used to implement embodiments described herein. The exemplary computing system 1600 of FIG. 16 may include one or more processors 1610 and memory 1620. Memory 1620 may store, in part, instructions and data for execution by the one or more processors 1610. Memory 1620 can store the executable code when the exemplary computing system 1600 is in operation. The exemplary computing system 1600 of FIG. 16 may further include a mass storage 1630, portable storage 1640, one or more output devices 1650, one or more input devices 1660, a network interface 1670, and one or more peripheral devices 1680.

The components shown in FIG. 16 are depicted as being connected via a single bus 1690. The components may be connected through one or more data transport means. The one or more processors 1610 and memory 1620 may be connected via a local microprocessor bus, and the mass storage 1630, one or more peripheral devices 1680, portable storage 1640, and network interface 1670 may be connected via one or more input/output buses.

Mass storage 1630, which may be implemented with a magnetic disk drive or an optical disk drive, is a non-volatile storage device for storing data and instructions for use by a magnetic disk or an optical disk drive, which in turn may be used by one or more processors 1610. Mass storage 1630 can store the system software for implementing embodiments described herein for purposes of loading that software into memory 1620.

Portable storage 1640 may operate in conjunction with a portable non-volatile storage medium, such as a compact disk (CD) or digital video disc (DVD), to input and output data and code to and from the computing system 1600 of FIG. 16. The system software for implementing embodiments described herein may be stored on such a portable medium and input to the computing system 1600 via the portable storage 1640.

One or more input devices 1660 provide a portion of a user interface. The one or more input devices 1660 may include an alphanumeric keypad, such as a keyboard, for inputting alphanumeric and other information, or a pointing device, such as a mouse, a trackball, a stylus, or cursor direction keys. Additionally, the computing system 1600 as shown in FIG. 16 includes one or more output devices 1650. Suitable one or more output devices 1650 include speakers, printers, network interfaces, and monitors.

Network interface 1670 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 570 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 1680 may include any type of computer support device to add additional functionality to the computing system. The one or more peripheral devices 1680 may include a modem or a router.

The components contained in the exemplary computing system 1600 of FIG. 16 are those typically found in computing systems that may be suitable for use with embodiments described herein and are intended to represent a broad category of such computer components that are well known in the art. Thus, the exemplary computing system 1600 of FIG. 16 can be a personal computer, handheld computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a central processing unit (CPU) for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, various embodiments of methods and systems for redacting select content in documents across multiple repositories have been described. Although embodiments have been described with reference to specific examples, it will be evident that various modifications and changes can be made to these example embodiments without departing from the broader spirit and scope of the present application. Accordingly, the specification and drawings are to be regarded in an illustrative rather than a restrictive sense. There are many alternative ways of implementing the present technology. The disclosed examples are illustrative and not restrictive.

What is claimed is:

1. A system for redacting at least one asset field from at least one document stored in a document repository, the system comprising:
    an application server for processing a plurality of documents, the application server further comprising:
        a plurality of repository interfaces, each of the plurality of repository interfaces connecting to a different document repository of a plurality of document repositories and storing a plurality of documents, wherein the application server is configured to:
            receive an instruction to retrieve a document stored in a document repository of the plurality of document repositories;
            create a logical page in computer memory to recreate the document stored in the document repository;
            determine a document class associated with the document stored in the document repository;
            receive and apply a redaction policy from a user instructing selection of an arbitrary portion of the document; and
            based on the associated document class, apply a plurality of redaction policies to the selected arbitrary portion of the document in the logical page in computer memory and the plurality redaction policies including at least one multi-layer redaction policy, the at least one multi-layer redaction policy including multi-layer access privilege that are defined to person or categories of persons that have permission to view certain unredacted content in the document, the certain unredacted content being based on previously specified types of content viewable by the person or categories of persons; and
    an application client computing device in communication with the application server, the application client computing device configured to be utilized by a user to view a displayed redacted logical page on a graphical user interface of the application client computing device.

2. The system of claim 1, wherein the plurality of redaction policies specify that a particular asset field of a document is to be hidden from view.

3. The system of claim 1, wherein the plurality of redaction policies are created using regular expression.

4. The system of claim 1, wherein the plurality of redaction policies are applied to the document in the logical page in computer memory based on pattern matching.

5. The system of claim 1, wherein the document repository is internal to an organization.

6. The system of claim 1, wherein the document repository is external to an organization.

7. The system of claim 1, wherein the document stored in the document repository is in a file format that is capable of being converted into a .pdf file format.

8. The system of claim 1, wherein the document stored in the document repository is in at least one of the following file formats: .bmp, .img, .png, .doc, .txt, .rtf, .xls, and .ppt.

9. A method for redacting at least one asset field from at least one document stored in a document repository, the method comprising:
- receiving, at a processor of a computing server, an instruction to retrieve a document stored in a document repository;
- creating a logical page in computer memory to recreate the document stored in the document repository, by the processor of the computing server;
- determining a document class associated with the document stored in the document repository, by the processor of the computing server;
- receive and apply a redaction policy from a user instructing selection of an arbitrary portion of the document;
- based on the associated document class, applying a plurality of redaction policies to the selected arbitrary portion of the document in the logical page in computer memory, by the processor of the computing server, wherein the plurality of redaction policies specify that a particular asset field of a document is to be hidden from view and the plurality of redaction policies including at least one multi-layer redaction policy, the at least one multi-layer redaction policy including multi-layer access privilege that are defined to person or categories of persons that have permission to view certain unredacted content in the document, the certain unredacted content being based on previously specified types of content viewable by the person or categories of persons;
- determining an identity of a user submitting the instruction to retrieve the document stored in the document repository;
- determining an associated role for the user;
- determining that the associated role is permitted to view content of the asset field for the applied plurality of redaction policies; and
- displaying an unredacted version of the logical page to a user on a graphical user interface of a second computing device.

10. The method of claim 9, wherein the plurality of redaction policies is created using regular expression.

11. The method of claim 9, wherein the plurality of redaction policies are applied to the document in the logical page in computer memory based on pattern matching.

12. The method of claim 9, wherein the document repository is internal to an organization.

13. The method of claim 9, wherein the document repository is external to an organization.

14. The method of claim 9, wherein the document stored in the document repository is in a file format that is capable of being converted into a .pdf file format.

15. A method for redacting at least one asset field from at least one document stored in a document repository, the method comprising:
- receiving, at a processor of a computing server, an instruction to retrieve a document stored in a document repository;
- creating a logical page in computer memory to recreate the document stored in the document repository, by the processor of the computing server;
- determining a document class associated with the document stored in the document repository, by the processor of the computing server;
- receive and apply a redaction policy from a user instructing selection of an arbitrary portion of the document;
- based on the associated document class, applying a plurality of redaction policies to the selected arbitrary portion of the document in the logical page in computer memory, by the processor of the computing server, the plurality of redaction policies specifying that a particular asset field of a document is to be hidden from view and the plurality of redaction policies including at least one multi-layer redaction policy, the at least one multi-layer redaction policy including multi-layer access privilege that are defined to person or categories of persons that have permission to view certain unredacted content in the document, the certain unredacted content being based on previously specified types of content viewable by the person or categories of persons; and
- displaying the redacted logical page to a user on a graphical user interface of a second computing device.

16. The method of claim 15, wherein the plurality of redaction policies are created using regular expression.

17. The method of claim 15, wherein the document repository is internal to an organization.

18. The method of claim 15, wherein the document repository is external to an organization.

19. The method of claim 15, wherein the document stored in the document repository is in a file format that is capable of being converted into a .pdf file format.

20. The method of claim 15, wherein the document stored in the document repository is in at least one of the following file formats: .bmp, .img, .png, .doc, .txt, .rtf, .xls, and .ppt.

21. The system of claim 1, wherein the multi-layer access privilege that are defined to person or categories of persons that have permission to view certain unredacted content in the document comprise:
- low level of access privileges for a low access privilege person including permission to view certain types of unredacted content in the document but not other types of content in the document;
- high level of access privileges for a high access privilege person including permission to view more types of unredacted content in the document compared with the low access privilege person.

22. The system of claim 21,
- wherein the low level of access privileges for the low access privilege person includes permission to view mailing address in an unredacted form in the document but not a social security number in the document;
- wherein the high level of access privileges for the high access privilege person includes permission to view a mailing address and a social security number in an unredacted form in the document.

23. The system of claim 1, further comprising migrating a federated redaction policy to at least one local server of a particular software system.

24. The method of claim 9, further comprising migrating a federated redaction policy to at least one local server of a particular software system.

25. The method of claim 15, further comprising migrating a federated redaction policy to at least one local server of a particular software system.

* * * * *